May 5, 1953   B. N. FISHER   2,637,558
AUTOMATIC RECORD CHANGER PHONOGRAPH WITH MOVABLE
LOADING SUPPORT AND STACK ALIGNING MEMBER
Filed March 5, 1949   5 Sheets-Sheet 1

*INVENTOR.*
BERNE N. FISHER
BY James and Franklin

May 5, 1953 B. N. FISHER 2,637,558
AUTOMATIC RECORD CHANGER PHONOGRAPH WITH MOVABLE
LOADING SUPPORT AND STACK ALIGNING MEMBER
Filed March 5, 1949 5 Sheets-Sheet 2
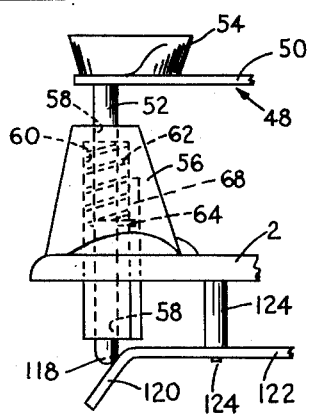
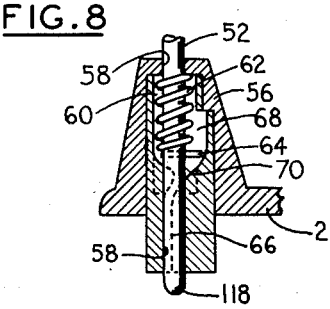
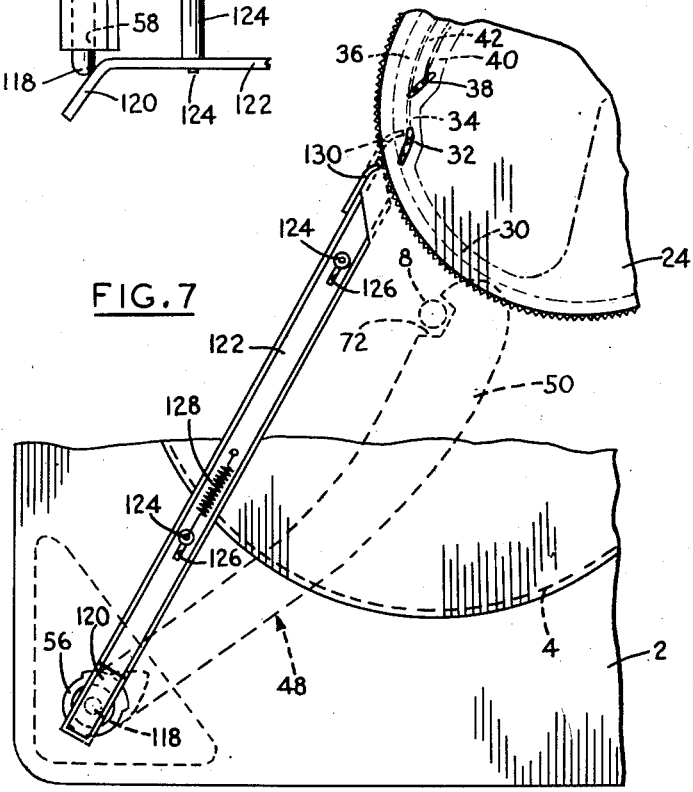
INVENTOR.
BERNE N. FISHER
BY James and Franklin May 5, 1953            B. N. FISHER            2,637,558
AUTOMATIC RECORD CHANGER PHONOGRAPH WITH MOVABLE
LOADING SUPPORT AND STACK ALIGNING MEMBER
Filed March 5, 1949            5 Sheets-Sheet 3
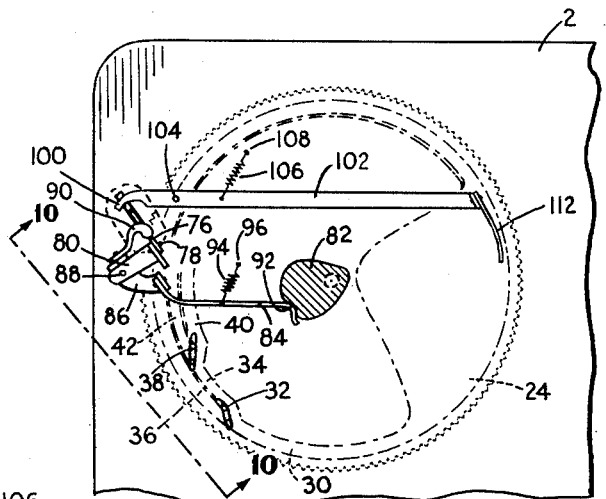
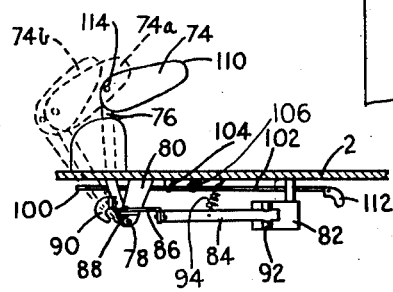
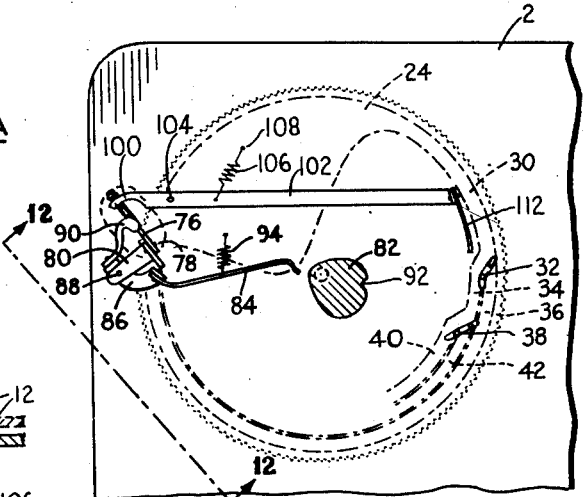
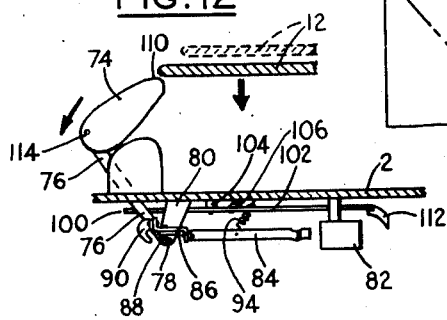
INVENTOR.
BERNE N. FISHER

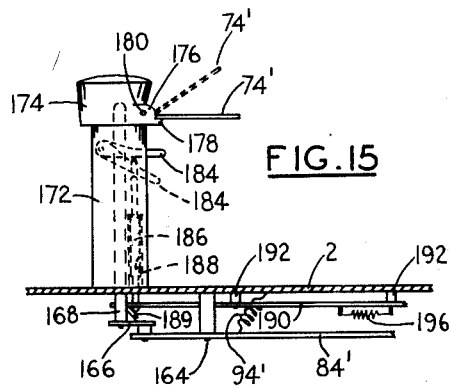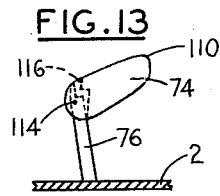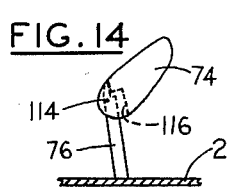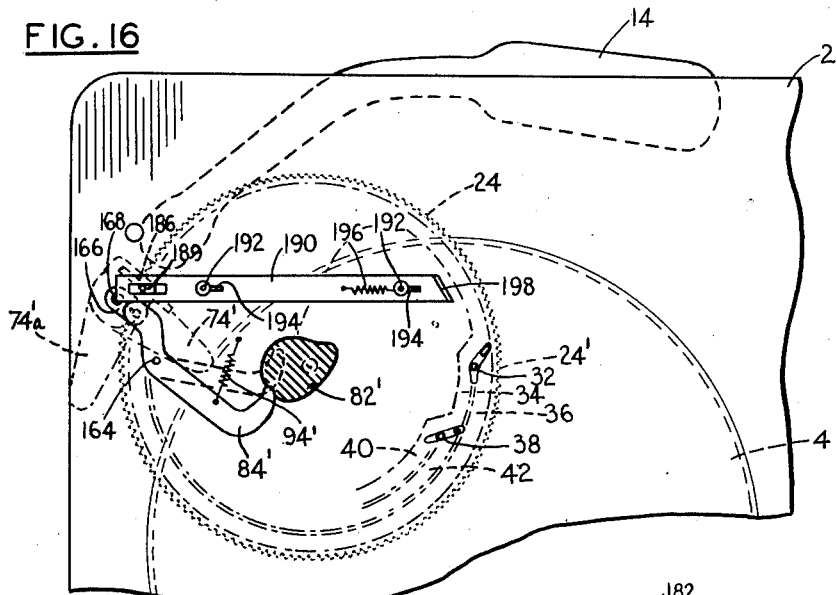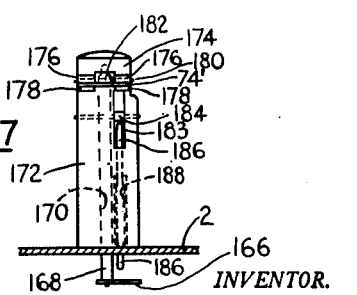

INVENTOR.
BERNE N. FISHER
BY
James and Franklin

UNITED STATES PATENT OFFICE 2,637,558

AUTOMATIC RECORD CHANGER PHONOGRAPH WITH MOVABLE LOADING SUPPORT AND STACK ALIGNING MEMBER

Berne N. Fisher, Roselle, N. J., assignor to General Instrument Corporation, Elizabeth, N. J., a corporation of New Jersey Application March 5, 1949, Serial No. 79,834

16 Claims. (Cl. 274—10)

The present invention relates to a drop automatic record changer in which a stack of records is supported above a turntable on a spindle adapted to engage the stack of records at their central apertures, and in particular to such a record changer in which means including a movable loading support and a stack aligning member are provided to facilitate the loading and retaining of the records on said spindle.

Record changers of the general type under discussion have in the past assumed a large variety of forms, both as regards support for the records before they are dropped to the turntable and mechanism for causing the records to drop one by one to the turntable. These prior art constructions, while they have achieved their objectives with varying degrees of success, have in general been characterized by a certain complexity of appearance and functioning not at all necessary to the proper achievement of the objectives of such a changer. Means in addition to the spindle are usually provided for supporting the records above the turntable at one or more points about their periphery in order to prevent the lowermost record from dropping to the turntable and to maintain the records in a secure position on the spindle. The mechanism for causing the lowermost record of the stack to drop along the spindle to the turntable has often been associated with such peripheral record supports, but in some embodiments it has been incorporated into the spindle itself. However, even when the latter is the case, peripheral record supports have in the past been considered necessary to the record changer. Such peripheral supports, even in their simplest forms, have materially added to the expense of manufacture of the record changer, have given to it a cluttered and mechanistic appearance generally displeasing to users thereof, and in addition have interfered with the ease of manipulation of the records, particularly when it is desired to lift the records from the turntable.

I have discovered that an effective automatic record changer can be produced without employing any peripheral supports for the records once they are in stacked position on the spindle above the turntable. The spindle alone supports the stack above the turntable, and the mechanism for causing the lowermost record of the stack to drop to the turntable is incorporated into the spindle in well known manner. The stack of undropped records is retained on the spindle above the turntable in secure position by means of a stack aligning member engageable with the top surface of the uppermost record of the stack.

In order to facilitate loading of the stack of records on the spindle, which loading must necessarily be done before the stack aligning member is engaged with the uppermost record of the stack, I provide a loading support adapted to engage the periphery of the lowermost record of the stack being loaded onto the spindle only when that stack is in the tilted or non-normal position which the stack will assume when the stack aligning member is not active thereupon. Once the stack has been completely placed upon the spindle above the turntable and the stack aligning member is engaged with the top surface of the uppermost record, the stack will assume its normal position out of engagement with the loading support. While I prefer that the normal secure position of the stack be horizontal and employ a straight spindle and horizontal stack aligning member to that end, the normal position of the stack may be at an inclination to the horizontal, in which case the loading or non-normal position is differently angularly related to the horizontal. The loading support is so constructed as to permit free lifting of records from the turntable, and is further preferably so acted upon by the actuating mechanism for the record changer as to be movable out of the way of the records being dropped to the turntable during the record changing operation and then movable back to its normal supporting position under but spaced from the lowermost record of the stack after the record changing cycle has been completed, the loading support, in this latter position, which is its normal position, ensuring security to the stack of records above the turntable should the stack aligning member become inoperative for any reason or should the changer be subjected to a shock sufficient in intensity to cause the stack to tilt irrespective of the action of the stack aligning member.

Because the stack, when in its normal position, does not contact the loading support, the functioning of the record changer is improved when compared with conventional apparatus. The lowermost record of the stack, during a record changing sequence, slides only with respect to the record thereabove. In conventional apparatus it must also slide with respect to its peripheral support. In addition, in conventional apparatus, when the lowermost record drops, the remainder of the stack also drops and tends to strike the peripheral support with some force, the point of contact being at the edge of the record, and it often happens that the edges will chip after repeated impacts. When such chipping occurs, not only is a part of the reproduced intelligence on the record often lost, but the record is rendered unsuitable for use with still other types of automatic record changers in which plates are interposed between the edges of the records in the stack during the record changing cycle. The impact of the fall also tends to develop cracks in the record. By eliminating the peripheral record supports of the prior art structures, my record changer eliminates these undesirable features and, hence, functions more efficiently than its predecessors.

A record changer of the type under discussion is particularly adapted for playing a stack of records of varying sizes. When such a mixed stack is employed, means must be provided for depositing the tone arm of the reproducer at an initial position corresponding to the size of the last record dropped onto the turntable. It has long been proposed to utilize a tripping finger which will be tripped by the large size records and not tripped by the small size records to actuate mechanism which controls the point at which the tone arm is deposited. In one embodiment of my construction the function of this tripping finger is performed by the loading support itself, thus materially simplifying the mechanism necessary for providing a record changer capable of automatically changing a stack of records of mixed sizes. In another embodiment of my invention a separate tripping finger is employed which is mounted in close physical and functional relationship to the loading support.

The stack aligning member which engages the top surface of the record stack and holds that stack in position at predetermined inclination, must extend over the turntable in order to accomplish this result. When the last record of the stack has been reproduced and it is desired to remove the stack from the turntable along the spindle, it is necessary that this stack aligning member be moved away from the turntable. In my construction this is accomplished automatically, the stack aligning member being so constructed and mounted that as soon as the last record has been dropped to the turntable, the stack aligning member will move to one side of the turntable so as to permit free access to the stack of records thereon. In a preferred embodiment this same automatic movement of the record levelling member will actuate additional mechanism effective, for example, to stop the record player after the last record has been reproduced or to otherwise condition the record player in response to the fact that there are no more records held on the spindle above the turntable.

The primary object of the present invention is to devise a simplified automatic record changer of improved appearance, of inexpensive construction, and with more desirable playing characteristics.

Another object of the present invention is to devise a record changer in which records are maintained on a spindle above a turntable without any peripheral support therefor, a stack aligning member engageable with the top surface of the records being effective to hold them in secure position on the spindle ready to be dropped one at a time to the turntable.

Yet another object is to provide, with such a record changer, a loading support cooperable with the record stack while it is being placed in position on the spindle, but not engageable therewith while the records are in position engaged by the stack aligning member and ready to be dropped to the turntable. A subsidiary object is to provide such a loading support so constructed as to offer no impediment to the free lifting of the records from the turntable after they have been reproduced.

A further object of the present invention is to provide such a loading support which is automatically movable between its record changing position, in which it will engage the lowermost record of the stack until that record is in turn acted upon by the stack aligning member, and a record dropping position in which the loading support is moved away from its position between the turntable and the stack so that the records may freely fall to the turntable.

An additional object of the present invention is to devise such a loading support which, when a stack of records of mixed sizes is to be reproduced, will cooperate with records of the larger size so as to condition the record changer properly to reproduce such records.

A still further object is to devise a stack aligning member which is engageable with the top surface of the uppermost record of the stack above the turntable so as to hold that stack in secure and aligned position at predetermined inclination, the stack aligning member being automatically movable to a position outside the turntable when the last record has been dropped to the turntable in order that said member provides no impediment to the free removal of records from the turntable after they have been reproduced. A subsidiary object is to employ the movement of the stack aligning member to its position outside the turntable to cause the record changer to respond in appropriate manner to the fact that no more records remain to be reproduced.

To the accomplishment of the foregoing objects and such other objects as may hereinafter appear, the present invention relates to an automatic record changer as defined in the appended claims and as described in this specification, taken together with the accompanying drawings, in which—

Fig. 6 is a side view on an enlarged scale of the mounting for the stack aligning member;

Fig. 7 is a schematic view taken from below showing the manner in which movement of the stack aligning member to its position outside the turntable conditions the operation of the record changer;

Fig. 8 is a side cross-sectional view similar to Fig. 6 showing the internal construction of the mount for the stack aligning member;

Fig. 9 is a schematic view taken from below showing the linkage controlling the position of the loading support, that linkage being shown in its normal position when record changing is not taking place;

Fig. 10 is a side elevational view, partially in cross-section, taken along the line 10—10 of Fig. 9, showing the position of the loading support corresponding to Fig. 9;

Fig. 10a is a fragmentary view similar to Fig. 10 but showing the spring active on the loading support;

Fig. 11 is a view similar to Fig. 9 but showing the position the various parts assume during a record changing sequence;

Fig. 12 is a view similar to Fig. 10 but taken along the line 12—12 of Fig. 11 and corresponding to the position of the elements in Fig. 11;

Fig. 13 is a detail side view of the mounting of the loading support showing that support in its normal horizontal position;

Fig. 14 is a view similar to Fig. 13 but showing the support in the upwardly inclined position which it will assume as records are lifted from the turntable;

Fig. 15 is a side elevational view showing another embodiment of the loading support;

Fig. 16 is a schematic view of the linkage associated with the loading support of Fig. 15;

Fig. 17 is a side elevational view of the loading support of Fig. 15 and the mounting therefor taken from the right-hand side of Fig. 15;

Figure 1:
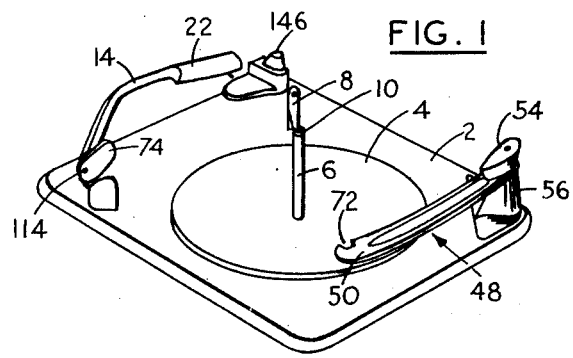
Fig. 1 is a three-quarter perspective view taken from above of one embodiment of the present invention with no records thereupon.
Figure 3:
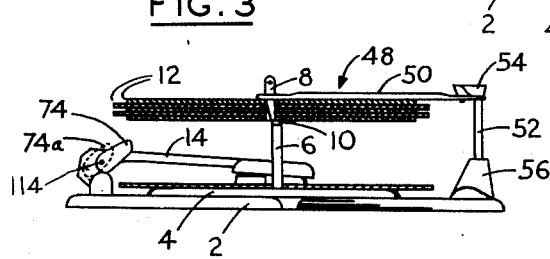
Fig. 3 is a view similar to Fig. 2 but showing the position of the various elements during reproduction of a record.
Figure 4:
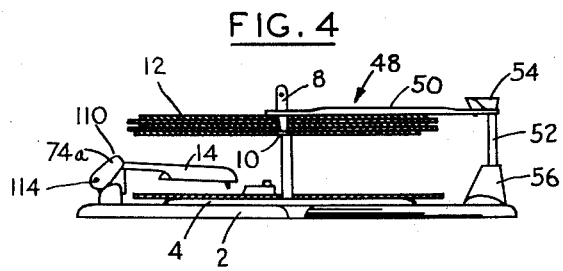
Fig. 4 is a view similar to Fig. 2 but showing the relative position of the elements at one instant of a record changing cycle.
Figure 5:
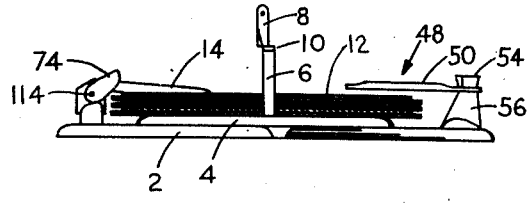
Fig. 5 is a view similar to Fig. 2 but showing the position of the elements after all the records have been reproduced.

The record changer of the present invention is here illustrated in detail only with regard to the non-conventional and inventive features thereof. The changer comprises a base plate 2 on which a turntable 4 is rotatably mounted, the turntable being driven by means of a motor (not shown) through a conventional rim drive (also not shown). A spindle 6 is centrally mounted with respect to the turntable 4, the turntable rotating thereabout, the spindle having an offset upper portion 8 and a rotatable button 10 immediately below the offset portion 8, the button being rotatable between the position shown in Figs. 1 and 3, the records 12 resting thereupon with their central apertures engaged by the upper portion 8 of the spindle 4, and the position shown in Fig. 4, in which the button 10 is moved concentric with the central apertures of the stack of records 12, thus permitting the stack of records to drop slightly, the central aperture of the lowermost record 12 of the stack fitting over the button 10. When the button 10 is moved back to its position concentric with the lower portion of the spindle 6, the lowermost record 12 of the stack will be slid laterally with respect to the remainder of the records 12 in the stack until its central aperture is coincident with the lower portion of the spindle 6, after which the record will fall to the turntable by its own weight. The mechanism for rotating the button 10 is conventional and will not be further discussed in this application.

Figure 18:
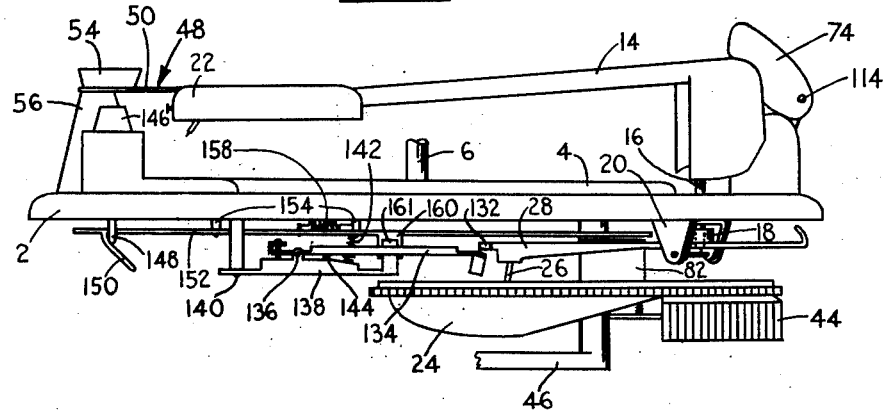
Fig. 18 is a side elevational view of the record changer showing the positioning of the control cam and associated control mechanism.

The record changer is also provided with a tone arm 14 which (see Fig. 18) is mounted on shaft 16 which passes downwardly through the base plate 2 and is rotatably received within yoke 18, the yoke in turn being pivotally mounted between ears 20 secured to the underside of the base plate 2, by reason of which the stylus carrying end 22 of the tone arm is swingable toward and away from the spindle 6 and is liftable above the turntable 4 and is depositable downwardly thereupon or upon whatever record 12 may be thereon. The necessary motion of the tone arm 14 is controlled by a three-dimensional cam 24 rotatably mounted below the base plate 2 by means of bracket 46 and cooperable with a cam follower 26 which is secured to sweep arm 28, the sweep arm 28 being connected to the yoke 18 and shaft 16 so as to move the tone arm in appropriate manner. When the control cam 24 is caused to rotate in order to perform a record changing sequence, this rotation being started by any appropriate tripping mechanism actuated by the tone arm 14, the cam follower 26 is first lifted and moved outwardly, thus lifting the tone arm 14 above the record reproduction of which has just been completed and swinging it outwardly beyond the turntable 4 and the periphery of that record. The cam follower 26 next moves into came groove 30 in this outward position until it comes to track switch 32 which is normally in position such that the cam follower 26 will move into the inner groove 34 but which is movable, by mechanism hereinafter to be discussed, to block the groove 34 and cause the cam follower 26 to move into outer groove 36. When the cam follower moves in the groove 34, it comes to a second track switch 38 normally positioned to guide the cam follower 26 into an inner downwardly inclined groove 40 but which is movable, by mechanism herein after to be described, to guide the cam follower 26 into the outer downwardly inclined groove 42. Under normal circumstances the cam follower 26 will be guided into the inner groove 40, thus swinging the tone arm 14 inwardly over the records on the turntable to a position corresponding to the inner groove of, for example, a ten inch record. When the cam follower comes to the downwardly inclined portion of the groove 40, the tone arm is deposited on the record and reproduction commences. This three-dimensional cam 24 will be recognized as one which is relatively conventional in this field. The cam 24 may be provided with a sector gear section 44 which is employed to rotate the button 10, but any other means for rotating the button 10 may be employed.

The stack aligning member generally designated 48 comprises an arm 50 mounted on shaft 52 and provided with a manipulating handle 54. The shaft is in turn mounted in sleeve 56 so as to be rotatable therein and at the same time axially movable therethrough. The sleeve is provided with upper and lower bearing portions 58 for guiding the shaft 52 and with an internally cutout portion 60 in which spring 62 is compressed, the spring being active upon pin 64 projecting out from the shaft 52. The end of the pin 64 is in turn receivable in an internal cam slot (see Fig. 8) having a lower narrow portion 66 within which the pin 64 cannot move from side to side and an upper wide portion 68 in which the pin 64 can move laterally, the cam portions 66 and 68 being connected by means of curved surface 70. The spring 62 constantly tends to urge the shaft 52, and hence the stack aligning arm 50, downwardly, but when the shaft 52 moves downwardly within the sleeve 56, the pin 64 secured thereto is forced into the lower narrow portion 66 of the internal cam slot and, hence, the shaft 52 is caused to take up a fixed rotative position relative to the sleeve 56, in which position the arm 50 is swung outwardly beyond the turntable 4. However, when the shaft 52 is lifted so as to move axially upwardly in the sleeve 62, the pin 64 moves into the upper wide cam portion 68 and, hence, the shaft 52 may be rotated within limits in the sleeve 56, thus permitting it to take up a second rotative postion in which the arm 50 may be disposed over the turntable and, hence, may be engaged with the top surface of the uppermost record 12 of the stack above the turntable. In order to assist in this engagement, the arm 50 may be provided with a notch 72 adapted to fit around the upper portion 8 of the spindle (see Figs. 1 and 7).

Figure 2:
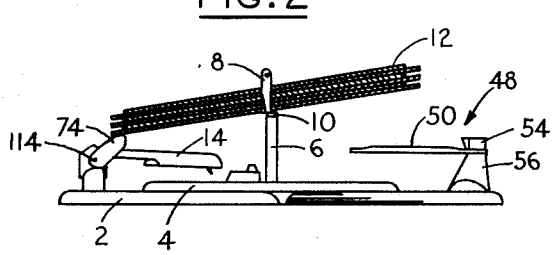
Fig. 2 is a side elevational view showing the relative position of the various elements of the record changer as records are being loaded onto the spindle above the turntable and before the stack aligning mechanism is engaged therewith, the records being shown in cross-section.

When records are preliminarily loaded upon the upper portion 8 of the spindle, the absence of any peripheral support for said records would render them unstable. Hence, the loading support 74 is provided which normally assumes a record supporting position beneath the periphery of the lowermost record 12 of the stack but below the point on the spindle 6 on which the stack is supported. Consequently, when the records are loaded onto the top portion 6 of the spindle as illustrated in Fig. 2, the records are inclined or tilted away from their normal stack-aligning-member-held position so that their edges are supported by the loading support 74. After the desired number of records 12 have been placed in the stack, the handle 54 of the stack aligning member 48 is grasped and lifted, thus lifting the stack aligning arm 50 and causing the shaft 52 to slide axially upwardly through the sleeve 56. When the stack aligning arm 50 has been lifted to a position above the uppermost record 12 of the stack. the handle 54 is twisted, causing the shaft 52 to rotate, this rotation being permitted because by this time the pin 64 is in the upper wide portion 68 of the cam slot in the sleeve 56, until the upper portion 8 of the spindle has been received within the slot 72. The handle 54 is then lowered until the arm 50 engages the top surface of the uppermost record 12 in the stack, the spring 62 pulling the arm 50 onto the uppermost record and, therefore, causing the record stack to assume its normal position and thus removing the periphery of the lowermost record from the loading support 74 (see Fig. 3).

In order for the record changing cycle to take place, that is to say, in order for a record to drop from the stack to the turntable, it is necessary that the loading support 74 be moved outwardly in order not to interfere with the free dropping of the record 12. However, if, for example, the stack aligning member 48 should become inoperative, the records might become disarranged on the spindle and jam the recording apparatus or cause damage to the records. Also, whenever the stack aligning member 48 is removed from its engagement with the stack, it is usually desired that the records be automatically supported, thus preventing damage to the records because of inadvertence on the part of the operator. Accordingly, the loading support 74 is so controllably moved as to normally retain its record supporting position under the lowermost record of the stack, spaced vertically therefrom when said record is held in normal position on the spindle 6 above the turntable 4, and adapted to be engaged by and support said lowermost record 12 and the stack of records thereabove when said stack is tilted from its normal position, but to be movable during a record changing cycle to a record changing position spaced outwardly from the spindle 6 with respect to its record changing position so that records are permitted to drop to the turntable, and then to be movable back to its record supporting position after the record has already fallen to the turntable. To this end (see Figs. 9–12), the loading support 74 is mounted on arm 76 pivotally mounted at 78 on a bracket 80 depending from the base plate 2. A cam 82 is mounted below the base plate 2 so as to be rotated during the record changing sequence, the cam being here shown in the form of a hub on the three-dimensional control cam 24 (see Fig. 18). When the control cam 24 is in the position it assumes during reproduction of a record, the cam 82 engages spring arm 84 which is in turn secured to lever 86 pivotally mounted at 88 on the bracket 80, the lever 86 having a preferably resilient extension 90 secured thereto which presses against the arm 76 and moves it to its forward position shown in Figs. 1, 2, 3, 5, and 10, at which time the loading support 74 is placed in its record supporting position. The cam 82 is preferably provided with a notch 92 for fixing thet position of the arm 84, and the arm 84 is acted upon by spring 94, one end of which is anchored at 96 to the base plate 2 so as always to be urged toward the cam 82.

When the record changing sequence is initiated, the control cam 24 and the eccentric cam 82 both rotate in a counter-clockwise direction as viewed in Figs. 9 and 11, rotation of the cam 82 permitting the arm 84 to move inwardly under the action of the spring 94 and thus causing the lever 86 to pivot counter-clockwise so that its extension 90 moves away from the arm 76. A spring 98 is active upon the arm 76 so as to cause it to pivot in a counter-clockwise direction, as viewed in Figs. 10 and 12, this motion of the cam 76 continuing until it comes into contact with the hooked portion 100 of an arm 102 pivotally mounted at 104 beneath the base plate 2 and urged into a limiting pivoted position by means of spring 106, one end of which is anchored at 108 to the base plate. The permitted motion of the lever 86 is such that the extension 90 is moved away from the arm 76 after the pivotal motion of the arm 76 is stopped by its engagement with the curved portion 100 of the arm 102. This position is illustrated in Figs. 11 and 12. When the arm 76 is in this position, the loading support 74 has been moved away from the spindle 6 to its record changing position, thus permitting records to fall from the stack to the turntable.

When, as here illustrated, the stack is composed of records of mixed sizes—for example, records having ten inch and twelve inch diameters—the loading support 74 may itself function as a feeler responsive to the size of the record being dropped onto the turntable so as to condition the record changing apparatus, and in particular the three-dimensional control cam 24, to deposit the tone arm 14 at the correct initial point. To this end, the loading support 74 is provided with a cam surface 110 which, when the loading support 74 is in its record changing position (see Fig. 12), is moved outwardly from the spindle 6 a distance sufficient for records of the smaller size to drop to the turntable quite freely, whereas the periphery of records of the larger size will engage the cam surface 110 and force the loading support 74 backwardly beyond its record changing position. This motion is permitted since the extension 90 of the lever 86 is not in contact with the arm 76 when that arm is in the position corresponding to the record changing position of the loading support 74, the backward motion of the arm 76 being active upon the curved portion 100 of the arm 102 so as to cause that arm to pivot in a clockwise direction, as viewed in Figs. 9 and 11, against the action of the spring 106. The free end of the arm 102 is provided with a preferably resilient finger 112 which is adapted to engage the second track switch 38 on the control arm 24 whenever the arm 102 is pivoted in a clockwise manner as described, but to fail to engage the second track switch 38 unless the arm 102 is pivoted. The action of the finger 112 upon the second track switch 38 causes it to assume a position such that the cam follower 26 is guided into the outer downwardly inclined groove 42, thus causing the tone arm 14 to be deposited at a position corresponding to the initial groove of a larger size record. During each rotation of the control cam 24, some conventional mechanism (not shown) presets the second track switch 38 so as to direct the cam follower 26 into the inner downwardly inclined cam groove 40, this being done before the second track switch 38 approaches the point at which it can be acted upon by the finger 112. Consequently, whenever a smaller size record falls to the turntable, the loading support 74 is not engaged thereby, the arm 102 is not pivoted, the second track switch 38 remains in its preset position, and the tone arm 14 is deposited at a position corresponding to the initial groove of a smaller size record. Whenever a larger size record drops to the turntable, the loading support 74 is cammed backwardly, the arm 102 is pivoted, and the finger 112 then moves the second track switch 38 from its preset position to its other position, thus ensuring that the tone arm 14 will be deposited at a point corresponding to the initial groove of the larger record.

When the record changing sequence draws to a close—that is to say, when the control cam 24 and the cam 82 approach their initial positions—the cam 82 will once again engage the arm 84 and move it against the action of the spring 94, thus causing the extension 90 on the lever 86 to engage the arm 76 and pivot that arm about the point 78 so as to move the loading support 74 back to its record supporting position. In Fig. 10 the three positions of the loading support 74 are illustrated, its record supporting position being shown in solid lines, its record changing position being shown in broken lines and designated 74a, and the position it assumes beyond its record changing position whenever it is cammed outwardly by a large size record being dropped to the turntable being shown by the broken lines designated 74b.

When the loading support 74 is in its record supporting position, as it is at all times except during a part of a record changing cycle, it necessarily extends inwardly toward the spindle 6 beyond the periphery of the records on the turntable. Consequently, it will present some impediment to free removal of the records from the turntable 4 after they have been reproduced. In order to eliminate any unnecessary manipulation on the part of the operator, the loading support 74 is so mounted on the arm 76 as not to interfere with removal of records from the turntable. As may best be seen from a comparison of Figs. 13 and 14, it is provided with an internal slot 116 within which the arm 76 is received, the support 74 and arm 76 being pivotally connected at 114. The upper end of the arm 76 and the interior portion of the slot 116 are so shaped that the loading support 74 normally assumes the lower position illustrated in Fig. 13 in which the lower portion of the slot 116 engages the edge of the arm 76 so as to act as a positive stop. Whenever records are lifted from the turntable 4, the upper surface of the uppermost record being lifted will engage the undersurface of the support 74 and will cause that support to pivot counterclockwise about the point 114 until its tip has moved outwardly beyond the periphery of the records. This is permitted because the upper portion of the slot 116 is appropriately shaped. The upward pivotal motion of the support 74 is limited by engagement between the upper portion of the slot 116 and the upper portion of the arm 76.

So long as records remain supported above the turntable 4 on the spindle 6, the stack aligning member 48 will be retained in an upper position, but as soon as the last record of the stack has dropped to the turntable, the spring 62 will cause the shaft 52 to move downwardly within the sleeve 56, the pin 64 thus being guided along the curved surface 70 into the narrow lower portion 66 of the internal cam slot so as to cause the record levelling arm 50 to swing out beyond the turntable. At the same time, the lower tip 118 of the shaft 52 will project downwardly through the bottom of the sleeve 56 and will engage an inclined surface 120 on arm 122 slidably mounted on the underside of the base plate 2 by means of pins 124 extending through slots 126 in the arm 122. A spring 128 tends to keep the arm 122 retracted away from the control cam 24, but whenever the shaft 52 moves fully downwardly through the sleeve 56, its tip 118 will act upon the inclined surface 120 so as to move the arm 122 inwardly in opposition to the action of the spring 128. The free end of the arm 122 is provided with a finger 130 which normally clears the control cam 24 (see the solid lines in Fig. 7), but which, when the arm 122 is projected forwardly, is adapted to engage the first track switch 32 (see the broken lines in Fig. 7). That track switch 32 is normally in a position blocking the outer track 36, being preset in that position by appropriate conventional mechanism (not shown), but whenever it is acted upon by the finger 130, it blocks the inner track 34 and thus guides the cam follower 26 into the outer track 36. It will be apparent from the above description that this will occur only after all of the records have been dropped to the turntable. When reproduction of the last record is completed, a record changing sequence will be initiated, but when the first track switch 32 passes the finger 130, it will open the outer track 36 and hence the cam follower 26 will move thereinto, thus retaining the tone arm in its outermost position. The sweep lever 28 (see Figs. 18 and 19) is provided with an extension 132 which, whenever the cam follower 26 is outwardly positioned on the cam 24, overlies resilient arm 134 which is pivotally mounted at 136 on switch housing 138, that housing in turn being pivotally mounted below the base plate 2 on pin 140 and urged inwardly by means of spring 142. The outer cam track 36 is provided with a depressed portion corresponding to the downwardly inclined portions of the inner tracks 40 and 42. Hence, when the record changing sequence comes to an end and the cam follower 26 is in the outer track 36, as will be the case when the finger 130 has appropriately set the first track switch 32, the sweep lever 28 will move downwardly and its extension 132 will depress the arm 134, that arm in turn depressing contact 144, opening the switch in the housing 138, and de-energizing the record changer motor. During a record changing cycle, when records remain in suspended position above the turntable, the tip 118 of the shaft 52 will not engage with the downwardly inclined surface 120 of the arm 122, and hence the first track switch 32 will guide the cam follower 26 inwardly a sufficient distance for the extension 132 on the sweep lever 28 to clear the arm 134 before the sweep lever 28 is permitted to drop. Hence, during such record changing sequences, the switch in the housing 138 remains closed and the turntable continues to rotate.

Figure 19:
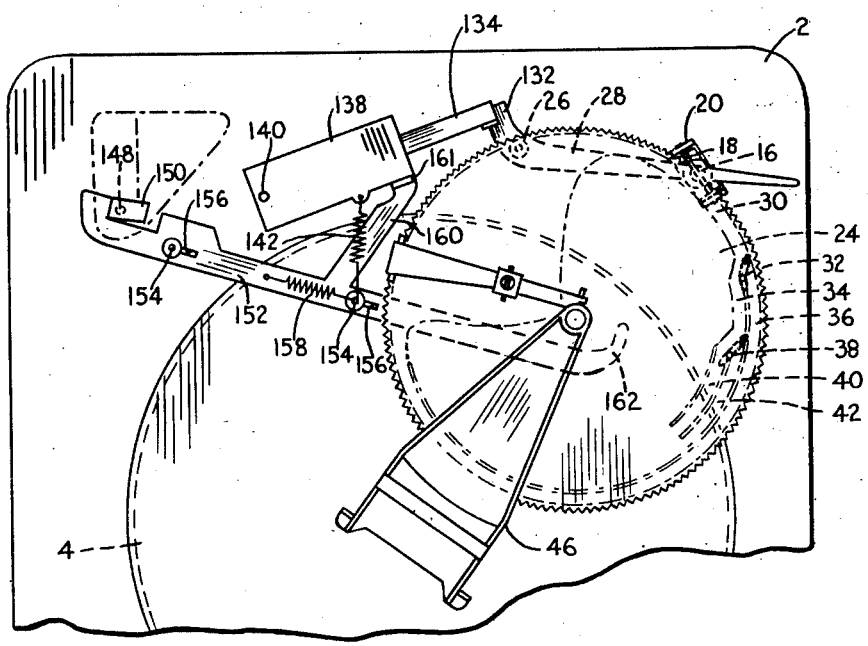
Fig. 19 is a bottom view of the record changer corresponding to Fig. 8.

Record changing may be reinstated by pressing the button 146, that button depressing pin 148 active against inclined surface 150 on arm 152, the arm in turn being slidably mounted beneath the base plate 2 by means of pins 154 receivable through slots 156. A spring 158 tends to keep the arm 152 in inner position, as shown in Fig. 19, the action of the pin 148 on the inclined surface 150 moving the arm 152 outwardly against the action of the spring 158. The arm is provided with an angular extension 160 which bears against a lug 161 on the switch housing 138 and causes that housing to pivot in a counterclockwise direction, as viewed in Fig. 19, whenever the button 146 is depressed. Such motion of the switch housing 138 moves the arm 134 out from under the extension 132 of the sweep lever 28, thus permitting the lever 134 to move upwardly, closing the switch in the housing 138, and starting the record changer motor. A hooked extension 162 on the arm 152 may be employed for manually tripping the mechanism which initiates a record changing sequence.

In the embodiment disclosed in Figs. 15 through 17, the loading support is in the form of a flat plate 74' which is rotatable between its record supporting position illustrated by the broken lines 74' in Fig. 16 and its record changing position illustrated by the broken lines 74'a in Fig. 16. In this embodiment, the arm 84' which engages the eccentric cam 82' which, as before, is preferably in the form of a hub on the control cam 24', is pivotally mounted on the underside of the base plate 2 at 164 and is in turn connected to crank 166 which rotates shaft 168 which passes up through passage 170 in sleeve 172 projecting upwardly from the base plate 2. The upper portion of the shaft 168 is secured to cap 174 which is provided with laterally spaced supporting members 176 each having projecting shelves 178 on which the loading support 74' is adapted to rest, a pin 180 passing through the projecting portions 176 and an upwardly curled portion 182 of the loading support 74' so that the loading support 74' is pivotal between a normal horizontal position supported on the shelves 178, as illustrated by solid lines in Fig. 15, and an upwardly inclined portion, as illustrated by broken lines in Fig. 15, the loading support 74' being moved into its latter position by engagement with records being removed from the turntable.

When the loading shelf 74' of the embodiments of Figs. 15 through 17 is moved to its record changing position, it is completely free of the turntable and, hence, it cannot itself function as a feeler controlled by the size of the record being dropped. Consequently, the sleeve 172 is provided with a slot 183 in which feeler 184 is pivotally mounted, the feeler normally assuming a horizontal position as indicated by the solid lines in Fig. 15, but being movable to a downwardly inclined position illustrated by the broken lines in Fig. 15 and indicated by broken lines in Fig. 15 whenever it is engaged by a large size record. A pin 186 is movably mounted within vertical aperture 188 in the sleeve 172 and the lower portion of that pin 186 engages with inclined surface 189 on arm 190 slidably secured below the base plate 2 by means of pins 192 and slots 194. A spring 196 tends to keep the arm 190 in forward position, in which position the free end 198 of the arm 190 will clear the second track switch 38 of the control cam 24'. However, whenever the feeler 184 is depressed, the arm 190 will be moved to the left, as viewed in Figs. 15 and 16, and, consequently, its free end 198 will engage with the second track switch 38' and position it so that the tone arm 14 will be deposited in a position corresponding to the initial groove of the larger size record.

The functioning and operation of my new record changer will in the main be fully apparent from the above. When records are to be loaded thereon, the stack aligning member 48 is automatically in an out-of-the-way position and the loading support 74 is automatically in its record changing position. The records are loaded onto the spindle in a position slightly inclined with respect to their normal position so as to be supported by the loading support 74. When the desired number of records have been loaded onto the spindle, the stack aligning member is lifted and moved inwardly over the turntable so as to engage the upper surface of the uppermost record of the stack, the stack aligning member then causing the records to assume their normal position at predetermined inclination out of engagement with the loading support 74, in which position they are retained during the entire record changing operation. As a result, the edges of the records are not subjected to any possibly damaging influences during the operation of the record changer and the records are dropped one by one to the turntable in a simple and efficient manner. Each time a record is to be dropped, and at an appropriate point in the record changing cycle, the loading support 74 is moved from its record supporting position to its record changing position in which it either permits a record to drop completely freely to the turntable 4, as is the case when records of small size are dropped, or in which it is engaged by records of larger size and cammed outwardly beyond its record changing position, thus actuating additional mechanism which so conditions the record changing apparatus as to deposit the tone arm in a position appropriate to the size of the record which has dropped. After the last record has fallen to the turntable, the stack aligning member 48 is automatically moved to a position outside the turntable so that it does not interfere with removal of records therefrom. At the same time, the motion of the stack aligning member 48 to said out-of-the-way position actuates additional mechanism which so conditions the record changing apparatus that when the last record of the stack has been reproduced, the record changer will automatically turn itself off. The loading support 74 is moved back to record supporting position at the end of each record changing cycle and, thus, is always in operative position when needed, as when, for example, the stack aligning member is manually removed from position in engagement with the topmost record of the stack in order to remove records from the stack or add records thereto. In its record supporting position, the loading support 14 is disposed inwardly beyond the periphery of the records being played, but, nevertheless, because of its manner of mounting it presents no real impediment to records which are being removed from the turntable. As a result, the record changer of the present invention provides maximum efficiency, automatic operation, and a maximum of protection to the records, permits the reproducing of records of different sizes, and automatically shuts itself off when the last record has been played—all with a minimum of moving parts and extreme simplicity of appearance and inexpensiveness of structure.

It will be apparent that many detailed changes may be made in the structure here disclosed without departing from the spirit of the invention as defined in the following claims.

I claim:

1. An automatic record changer comprising a frame, a turntable, a spindle centrally mounted with respect to said turntable, having a shoulder, and adapted to engage a stack of records at their central apertures and hold them on its shoulder above said turntable, dropping means active upon said records for causing them to drop one by one to the turntable, a stack aligning member engageable with the top surface of the uppermost record of said stack so as to keep said records at predetermined inclination as they are held on the shoulder of said spindle, the lower surface of the lowermost record of said stack when at said predetermined inclination being free and unsupported except at said spindle shoulder, a loading support movable between a record supporting and a record changing position, said support in said record supporting position being under the lowermost record of said stack, spaced vertically therefrom when said record is held in predetermined inclination on said spindle above said turntable and adapted to be engaged by and support said lowermost record when said stack is tilted from predetermined inclination on said spindle, said support in said record changing position being spaced outwardly from said spindle with respect to said record supporting position so that records are permitted to drop to said turntable, and an actuating mechanism operatively connected to said dropping means and said loading support and effective to cause said support to move from its record supporting position to its record changing position when said dropping means is actuated to cause a record to drop from its spindle-held position to said turntable and to move back to its record supporting position after said record has dropped to the turntable.

2. An automatic record changer comprising a frame, a turntable, a spindle centrally mounted with respect to said turntable, having a shoulder, and adapted to engage a stack of records at their central apertures and hold them on its shoulder above said turntable, dropping means only on said spindle active on said records for causing them to drop one by one to the turntable, a stack aligning member engageable with the top surface of the uppermost record of said stack so as to keep said records at predetermined inclination as they are held on the shoulder of said spindle, the lower surface of the lowermost record of said stack when at said predetermined inclination being free and unsupported except at said spindle shoulder, a loading support movable between a record supporting and a record changing position, said support in said record supporting position being under the lowermost record of said stack, spaced vertically therefrom when said record is held in predetermined inclination on said spindle above said turntable and adapted to be engaged by said lowermost record when said stack is tilted from predetermined inclination on said spindle, said support in said record changing position being spaced outwardly from said spindle with respect to said record supporting position so that records are permitted to drop to said turntable, and an actuating mechanism operatively connected to said dropping means and said loading support and effective to cause said support to move from its record supporting position to its record changing position when said dropping means is actuated to cause a record to drop from its spindle-held position to said turntable and to move back to its record supporting position after said record has dropped to the turntable.

3. In the automatic record changer of claim 1, an element extending upwardly from said frame beyond the periphery of said records, said loading support extending inwardly from said element and being articulately mounted thereon so as to normally assume a record supporting position inside the periphery of said records but to be movable, by engagement with a record being lifted from said turntable along said spindle, to a position beyond the periphery of said record so that said record may be freely lifted from said spindle.

4. In the automatic record changer of claim 1, an element extending upwardly from said frame beyond the periphery of said records, said loading support extending inwardly from said element and being pivotally mounted thereon so as to normally assume a substantially horizontal record supporting position inside the periphery of said records but to be movable, by engagement with a record being lifted from said turntable along said spindle, to a substantially vertical position beyond the periphery of said record so that said record may be freely lifted from said spindle.

5. In the automatic record changer of claim 1, an element extending upwardly from said frame beyond the periphery of said records and movable between inner and outer positions, said loading support being secured to and extending inwardly from said element, said support being in record supporting position when said element is moved to its inner position and being in record changing position when said element is moved to its outer position, said actuating mechanism being operatively connected to said element to cause it to move from its inner to its outer position and back again in timed relation to the movement of said dropping means.

6. In the automatic record changer of claim 1, an element extending upwardly from said frame beyond the periphery of said records and movable between inner and outer positions, said loading support being secured to and extending inwardly from said element, said support being in record supporting position when said element is moved to its inner position and being in record changing position when said element is moved to its outer position, said support being pivotally mounted on said element so as to normally assume a substantially horizontal record supporting position but to be movable, by engagement with a record being lifted from said turntable along said spindle, to a substantially vertical position beyond the periphery of said record while said element is in its inner position so that said record may be freely lifted from said spindle, said actuating mechanism being operatively connected to said element to cause it to move from its inner to its outer position and back again in timed relation to the movement of said dropping means.

7. In the automatic record changer of claim 1, an element extending upwardly from said frame beyond the periphery of said records and being mounted to pivot about a substantially vertical axis between first and second positions, said loading support being secured to and extending inwardly from said element so as to be in record supporting position when said element is in its first position and to be in record changing position when said element is in its second position, said actuating mechanism being operatively connected to said element to cause it to move from its first to its second position and back again in timed relation to the movement of said dropping means.

8. In the automatic record changer of claim 1, an element extending upwardly from said frame beyond the periphery of said records and being mounted to pivot about a substantially vertical axis between first and second positions, said loading support being secured to and extending inwardly from said element so as to be in record supporting position when said element is in its first position and to be in record changing position when said element is in its second position, said support being pivotally mounted on said element so as to normally assume a substantially horizontal record supporting position but to be movable, by engagement with a record being lifted from said turntable along said spindle, while said element is in its first position, to a substantially vertical position beyond the periphery of said record so that said record may be freely lifted from said spindle, said actuating mechanism being operatively connected to said element to cause it to move from its first to its second position and back again in timed relation to the movement of said dropping means.

9. An automatic record changer comprising a frame, a turntable, a spindle centrally mounted with respect to said turntable and adapted to engage a stack of records of smaller and larger sizes at their central apertures and hold them above said turntable, dropping means active upon said records for causing them to drop one by one to the turntable, a stack aligning member engageable with the top surface of the uppermost record of said stack so as to keep said records in predetermined inclination as they are held on said spindle, a loading support having a cam surface movable between a record supporting and a record changing position, said support in said record supporting position being under the lowermost record of said stack even when said record is of the smaller size, spaced vertically therefrom when said record is held in predetermined inclination on said spindle above said turntable and adapted to be engaged by and support said lowermost record when said stack is tilted from predetermined inclination on said spindle, said support in said record changing position being spaced outwardly from said spindle a distance such that records of said smaller size will drop freely to said turntable but records of said larger size will engage with said cam surface so as to force said support outwardly beyond said record changing position as said records of larger size fall to the turntable, an actuating mechanism operatively connected to said dropping means and said loading support effective to cause said support to move from its record supporting position to its record changing position when said dropping means is actuated to cause a record to drop from its spindle-held position to said turntable and to move back to its record supporting position after said record has dropped to the turntable, and additional mechanism operatively connected to said support and responsive to the movement of said support outwardly beyond its record changing position for controlling said actuating mechanism.

10. An automatic record changer comprising a frame, a turntable, a spindle centrally mounted with respect to said turntable and adapted to engage a stack of records of smaller and larger sizes at their central apertures and hold them above said turntable, dropping means only on said spindle active upon said records for causing them to drop one by one to the turntable, a stack aligning member engageable with the top surface of the uppermost record of said stack so as to keep said records in predetermined inclination as they are held on said spindle, a loading support having a cam surface movable between a record supporting and a record changing position, said support in said record supporting position being under the lowermost record of said stack even when said record is of the smaller size, spaced vertically therefrom when said record is held in predetermined inclination on said spindle above said turntable and adapted to be engaged by and support said lowermost record when said stack is tilted from predetermined inclination on said spindle, said support in said record changing position being spaced outwardly from said spindle a distance such that records of said smaller size will drop freely to said turntable but records of said larger size will engage with said cam surface so as to force said support outwardly beyond said record changing position as said records of larger size fall to the turntable, an actuating mechanism operatively connected to said dropping means and said loading support effective to cause said support to move from its record supporting position to its record changing position when said dropping means is actuated to cause a record to drop from its spindle-held position to said turntable and to move back to its record supporting position after said record has dropped to the turntable, and additional mechanism operatively connected to said support and responsive to the movement of said support outwardly beyond its record changing position for controlling said actuating mechanism.

11. In the automatic record changer of claim 9, an element extending upwardly from said frame beyond the periphery of said records operatively connected to said actuating mechanism so as to be caused to move between inner and outer positions, said loading support being secured to and extending inwardly from said element, said support being in record supporting position when said element is moved to its inner position and being in record changing position, its cam surface being in position to be engaged by said larger size records as they drop from said spindle to said turntable, when said element is moved to its outer position, said element being movable to an extreme outer position when said cam surface is thus engaged, said element actuating said additional mechanism when moved to its extreme outer position.

12. The automatic record changer of claim 11, in which said loading support is pivotally mounted on said element so as to normally assume a substantially horizontal record supporting position but to be movable, by engagement with a record being lifted from said turntable along said spindle, when said element is in its inner position, to a substantially vertical position beyond the periphery of said record so that said record may be freely lifted from said spindle.

13. In an automatic record changer comprising a frame, a turntable, and a spindle centrally mounted with respect to said turntable and adapted to engage a stack of records at their central apertures and hold them above said turntable; a stack aligning member adapted to keep said records in predetermined inclination as they are held on said spindle above said turntable, said member comprising a vertically movable arm engageable with the top surface of the uppermost record of said stack, a resilient member operatively connected to said arm so as to move it downwardly into engagement with said uppermost record, and an operative connection between said arm and said frame active on said arm to move it outside of said turntable when said arm has moved downwardly a predetermined distance.

14. In an automatic record changer comprising a frame, a turntable, and a spindle centrally mounted with respect to said turntable and adapted to engage a stack of records at their central apertures and hold them above said turntable; a stack aligning member adapted to keep said records in predetermined inclination as they are held on said spindle above said turntable, said member comprising an arm engageable with the top surface of the uppermost record of said stack, a shaft secured to said arm, a sleeve on said frame outside the periphery of said turntable in which said shaft is rotatable and axially movable between upper and lower positions, a cam track within said sleeve, and a cam follower on said shaft, and movable in said cam track said cam track having a narrow lower portion laterally confining said cam follower to one angular position so as to cause said shaft to assume one rotative posiiton with said arm outside of said turntable when said shaft is in its lower axial position, said cam track having a wider upper portion permitting said cam follower a different angular position so as to permit said shaft to assume another rotative position with said arm over said turntable when said shaft is in its upper axial position.

15. The automatic record changer of claim 1 in which the loading support is positioned on the frame on the opposite side of said spindle from said shoulder.

16. The automatic record changer of claim 2 in which the loading support is positioned on the frame on the opposite side of said spindle from said shoulder.

BERNE N. FISHER.

References Cited in the file of this patent

UNITED STATES PATENTS

| Number | Name | Date |
|---|---|---|
| 1,390,404 | Wahlberg | Sept. 13, 1921 |
| 2,237,340 | Downs | Apr. 8, 1941 |

FOREIGN PATENTS

| Number | Country | Date |
|---|---|---|
| 382,276 | Great Britain | Oct. 17, 1932 |
| 235,600 | Switzerland | June 1, 1945 |
| 114,287 | Sweden | June 19, 1945 |
| 591,757 | Great Britain | Aug. 27, 1947 |